US005749506A

United States Patent [19]
Davies

[11] Patent Number: 5,749,506
[45] Date of Patent: May 12, 1998

[54] WILD GAME FIELD REMOVAL SYSTEM

[76] Inventor: Glen T. Davies, 32102 Glaser, Browns Town, Rockwood, Mich. 48173

[21] Appl. No.: 694,038

[22] Filed: Aug. 8, 1996

[51] Int. Cl.⁶ ............................................. B60R 9/06
[52] U.S. Cl. ...................... 224/501; 224/510; 224/525; 224/564
[58] Field of Search ........................... 224/501, 510, 224/497, 521, 525, 524, 564, 565

[56] References Cited

U.S. PATENT DOCUMENTS

| 930,410 | 8/1909 | Noonan | 224/510 X |
| 4,915,276 | 4/1990 | Devito | 224/521 |
| 5,372,287 | 12/1994 | Deguevara | 224/521 X |

FOREIGN PATENT DOCUMENTS

| 1027527 | 3/1978 | Canada | 224/501 |
| 1115670 | 1/1982 | Canada | 224/525 |
| 2428542 | 1/1980 | France | 224/501 |

*Primary Examiner*—Renee S. Luebke

[57] ABSTRACT

A new wild game field removal system for facilitating removal of various sizes of wild game carcasses from the field with a vehicle while keeping the vehicle uncontaminated by the wild game carcass. The inventive device includes a U-shaped basket for supporting a wild game carcass, a first adjustable support slidably secured to the U-shaped basket, a second adjustable support slidably secured to the U-shaped basket opposite of the first adjustable support, and a vehicle securing means removably attached to the rear of a vehicle and securing the U-shaped basket.

7 Claims, 3 Drawing Sheets

1

WILD GAME FIELD REMOVAL SYSTEM

BACKGROUND OF THE INVENTION

1. Field of the Invention

The present invention relates to rack device and more particularly pertains to a new Wild Game Field Removal System for facilitating removal of various sizes of wild game carcasses from the field with a vehicle while keeping the vehicle uncontaminated by the wild game carcass.

2. Description of the Prior Art

The use of rack devices is known in the prior art. More specifically, rack devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art rack devices include U.S. Pat. No. 4,906,015; U.S. Pat. No. 4,394,947; U.S. Design Pat. No. 337,087; U.S. Pat. No. 3,913,811; U.S. Pat. No. 5,224,636 and U.S. Pat. No. 4,775,282.

While these devices fulfill their respective, particular objectives and requirements, the aforementioned patents do not disclose a new Wild Game Field Removal System. The inventive device includes a U-shaped basket for supporting a wild game carcass, a first adjustable support slidably secured to the U-shaped basket, a second adjustable support slidably secured to the U-shaped basket opposite of the first adjustable support, and a vehicle securing means removably attached to the rear of a vehicle and securing the U-shaped basket.

In these respects, the Wild Game Field Removal System according to the present invention substantially departs from the conventional concepts and designs of the prior art, and in so doing provides an apparatus primarily developed for the purpose of facilitating removal of various sizes of wild game carcasses from the field with a vehicle while keeping the vehicle uncontaminated by the wild game carcass.

SUMMARY OF THE INVENTION

In view of the known types of rack devices now present in the prior art, the present invention provides a new Wild Game Field Removal System construction wherein the same can be utilized for facilitating removal of various sizes of wild game carcasses from the field with a vehicle while keeping the vehicle uncontaminated by the wild game carcass.

The general purpose of the present invention, which will be described subsequently in greater detail, is to provide a new Wild Game Field Removal System apparatus and method which has many of the advantages of the rack devices mentioned heretofore and many novel features that result in a new Wild Game Field Removal System which is not anticipated, rendered obvious, suggested, or even implied by any of the prior art rack devices, either alone or in any combination thereof.

To attain this, the present invention generally comprises a U-shaped basket for supporting a wild game carcass, a first adjustable support slidably secured to the U-shaped basket, a second adjustable support slidably secured to the U-shaped basket opposite of the first adjustable support, and a vehicle securing means removably attached to the rear of a vehicle and securing the U-shaped basket.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Wild Game Field Removal System apparatus and method which has many advantages and many novel features that result in a new Wild Game Field Removal System which is not anticipated, rendered obvious, suggested, or even implied by any of the prior art rack devices, either alone or in any combination thereof.

It is another object of the present invention to provide a new Wild Game Field Removal System which may be easily and efficiently manufactured and marketed.

It is a further object of the present invention to provide a new Wild Game Field Removal System which is of a durable and reliable construction.

An even further object of the present invention is to provide a new Wild Game Field Removal System which is susceptible of a low cost of manufacture with regard to both materials and labor, and which accordingly is then susceptible of low prices of sale to the consuming public, thereby making such Wild Game Field Removal System economically available to the buying public.

Still another object of the present invention is to provide a new Wild Game Field Removal System for facilitating removal of various sizes of wild game carcasses from the field with a vehicle while keeping the vehicle uncontaminated by the wild game carcass.

Yet another object of the present invention is to provide a new Wild Game Field Removal System which includes a U-shaped basket for supporting a wild game carcass, a first adjustable support slidably secured to the U-shaped basket, a second adjustable support slidably secured to the U-shaped basket opposite of the first adjustable support, and a vehicle securing means removably attached to the rear of a vehicle and securing the U-shaped basket.

Even still another object of the present invention is to provide a new Wild Game Field Removal System wherein the user's vehicle is not contaminated by blood or hair from the wild game carcass.

Still another object of the present invention is to provide a new Wild Game Field Removal System which removes wild game carcass from the field without the wild game carcass being contaminated.

Even still another object of the present invention is to provide a new Wild Game Field Removal System which is adjustable to accommodate various sizes of wild game.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
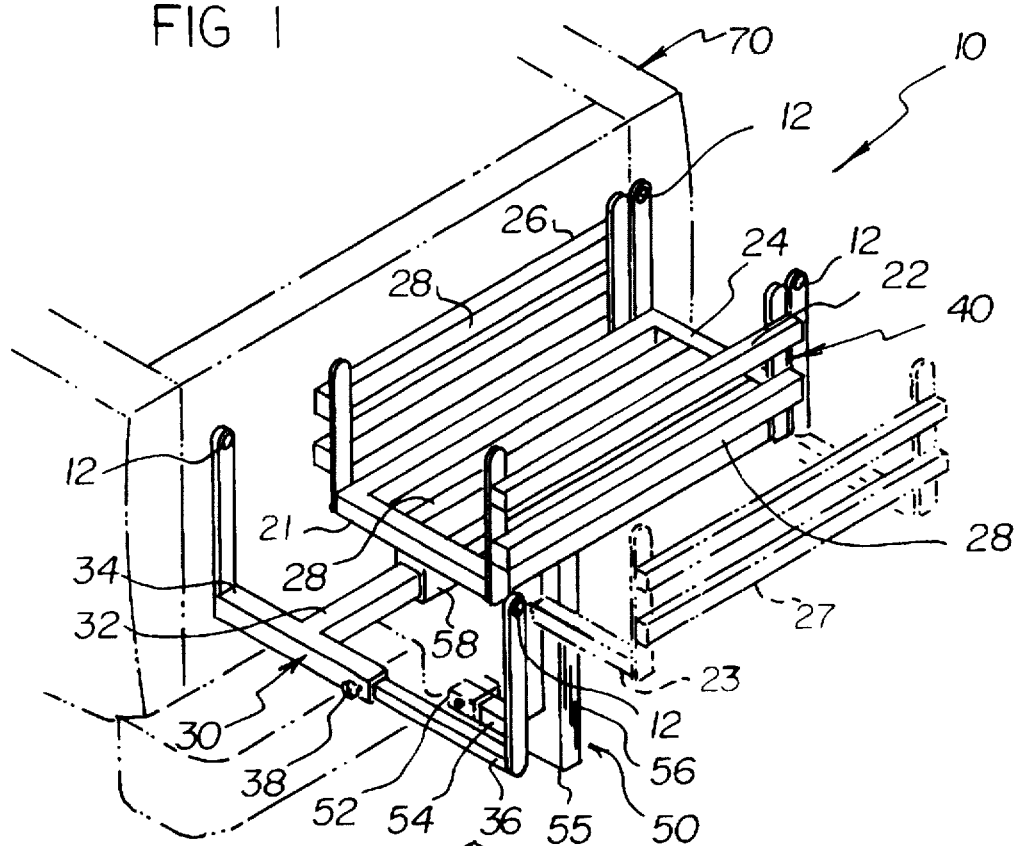
FIG. 1 is a rear perspective view of a new Wild Game Field Removal System displaying the U-shaped basket according to the present invention.

With reference now to the drawings, and in particular to FIGS. 1 through 6 thereof, a new Wild Game Field Removal System embodying the principles and concepts of the present invention and generally designated by the reference numeral 10 will be described.

More specifically, it will be noted that the Wild Game Field Removal System 10 comprises a U-shaped basket 20 which engages a wild game carcass, a first adjustable support 30 slidably secured to one end of the U-shaped basket 20, a second adjustable support 40 slidably secured to the end of the U-shaped basket 20 opposite of the first adjustable support 30, and a vehicle securing means 50 secured to a vehicle 70 and secured to the U-shaped basket 20.

Figure 2:
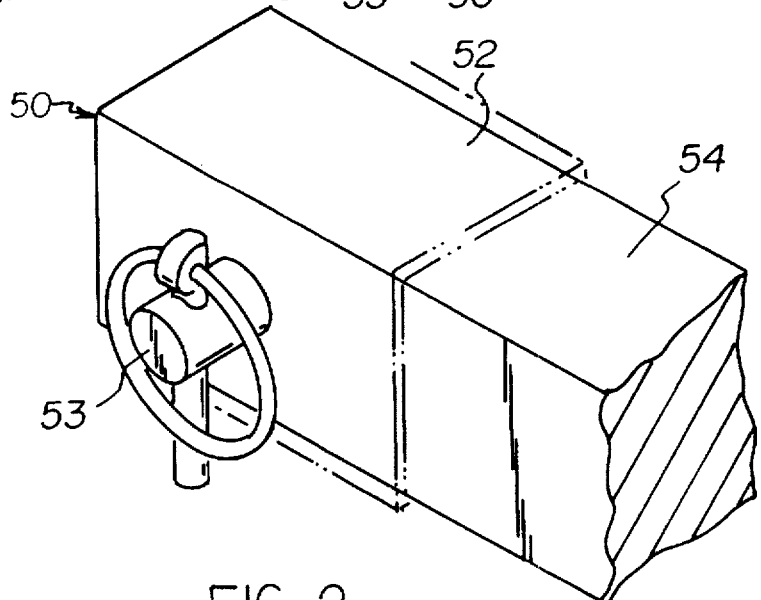
FIG. 2 is a magnified view of the vehicle securing means with the tongue member projecting into the securing pipe.
Figure 3:
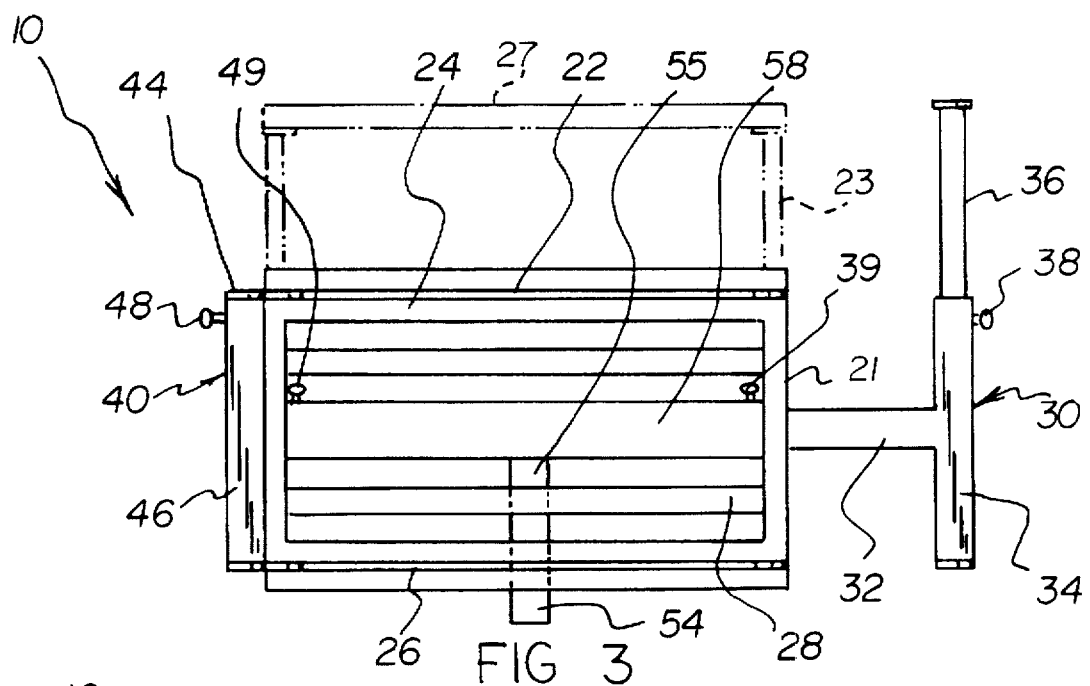
FIG. 3 is a top view of the U-shaped basket with the first reverse L-shaped member extended.
Figure 4:
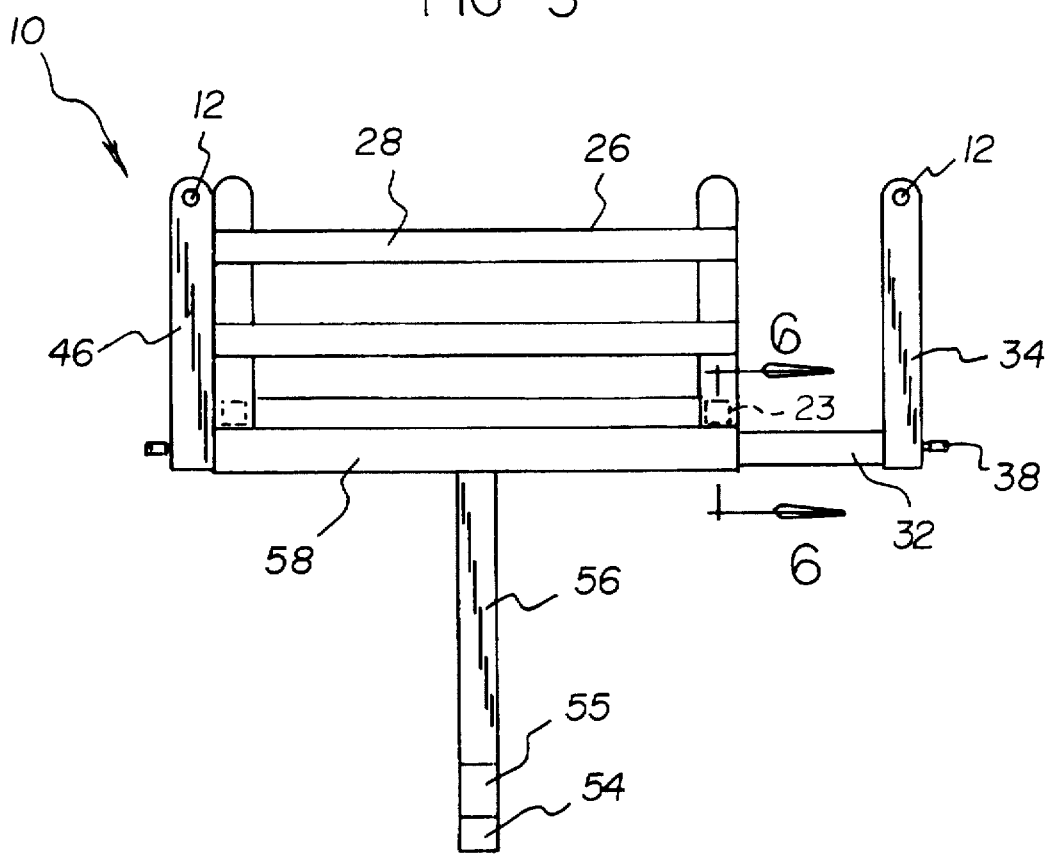
FIG. 4 is a front view of the invention.
Figure 5:
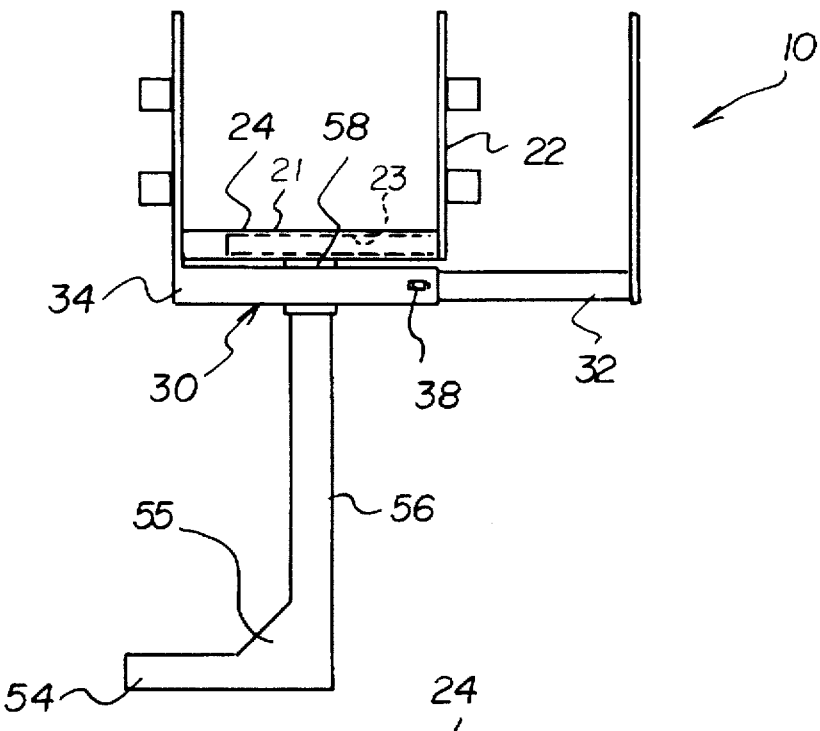
FIG. 5 is a side view of the first adjustable support.
Figure 6:
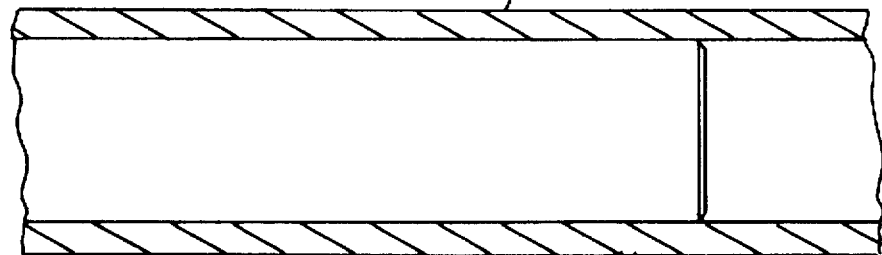
FIG. 6 is a cross sectional view taken along line 6—6 of FIG. 4 displaying the first length adjusting shaft encased by the basket support member and the first length adjusting screw.
Figure 6:
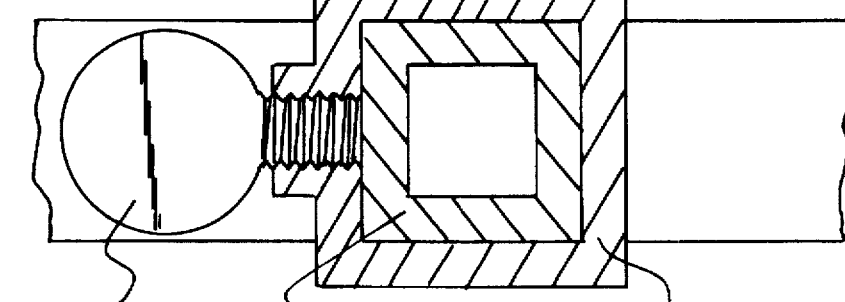

As best illustrated in FIGS. 1 through 6, it can be shown that the U-shaped basket 20 includes a slatted support platform 24 substantially rectangular shaped positioned horizontal to the ground. A first slatted side 22 is secured orthogonally to an elongated side of the slatted support platform 24 parallel to a tailgate 72 of the vehicle 70 as best shown in FIG. 1 of the drawings. A second slatted side 26 is secured orthogonally to the opposite elongated side from the first slatted side 22. The first slatted side 22, the slatted support platform 24 and the second slatted side 26 are all formed from a slotted structure 28 as shown in FIGS. 1, 3–4. The vehicle securing means 50 includes a securing pipe 52 mounted to the rear of the vehicle 70 perpendicular to the tailgate 72 as best shown in FIG. 2 of the drawings. A tongue member 54 removably projects into the securing pipe 52 and is retained in the securing pipe 52 by a securing pin 53 projecting through the securing pipe 52 through the tongue member 54 as best shown in FIG. 2 of the drawings. One end of an elevating member 56 is orthogonally secured to the end of the tongue member 54 opposite of the securing pipe 52. The elevating member 56 projects upward parallel to the tailgate 72 as best shown in FIG. 1 of the drawings. A triangular brace 55 is secured to the corner of both the tongue member 54 and the elevating member 56 as best shown in FIG. 5 of the drawings. A basket support member 58 is secured to the end of the elevating ember 56 opposite of the tongue member 54. The first adjustable support 30 includes a first length adjusting shaft 32 slidably projecting into one end of the basket support member 58 as best shown in FIG. 6 of the drawings. The first length adjusting shaft 32 is secured to the central lower portion of a first L-shaped member 34. The lower portion of a first reverse L-shaped member 36 slidably projects into the lower horizontal end of the first L-shaped member 34. A first width adjusting screw 38 projects into the first L-shaped member 34 engaging the first reverse L-shaped member 36 as best shown in FIG. 6 of the drawings. A first length adjusting screw 39 projects into the basket support member 58 engaging the first length adjusting shaft 32. The second adjustable support 40 includes a second length adjusting shaft (unnumbered) slidably projecting into one end of the basket support member 58 opposite of the first length adjusting shaft 32. The second length adjusting shaft is secured to the central lower portion of a second reverse L-shaped member 46. The lower portion of a second L-shaped member 44 slidably projects into the lower horizontal end of the second reverse L-shaped member 46. A second width adjusting screw 48 projects into the second reverse L-shaped member 46 engaging the second L-shaped member 44. A second length adjusting screw 49 projects into the basket support member 58 engaging the second length adjusting shaft (unnumbered). The first adjustable support 30 and the second adjustable support 40 preferably include a plurality of securing apertures 12.

In use, the user adjusts the first adjustable support 30 and the second adjustable support 40 to the length and width of the wild game carcass to be transported. The user then places the wild game carcass into the U-shaped basket 20 and the adjustable supports 30 and 40. The user then further secures the wild game carcass by tying a plurality of unnumbered ropes through the securing apertures 12 and around the wild game carcass.

A significant feature of the invention is the preferred lateral expandability of the U-shaped basket 20 (see FIGS. 1, 3, 4 and 5). The first slatted side 22 is horizontally movable away from the second slatted side 26 to an expanded position 27 (indicated by a broken outline in FIGS. 1 and 3) to expand the space available between the slatted sides 22, 26 for holding various sizes of wild game carcasses. The preferred means for providing the expandability feature is a telescoping tube arrangement with a relatively smaller inner tube 23 (shown in broken lines) slidably movable within the interior of a relatively larger outer tube 21 (see FIGS. 4 and 5). The inner tube 23 is mounted to a lower portion of the first slatted side 22 (see FIGS. 1 and 3), and the outer tube 21 preferably forms a portion of the slatted support platform 24 (see FIGS. 1 and 3). An assembly of telescoping inner 23 and outer 21 tubes are preferably located at each end of the support platform 24 (see FIGS. 1, 3 and 4). The position of the first slatted side 22 relative to the support platform 24 may be adjusted to the same spacing as the first 34 and second 44 L-shaped members (see FIGS. 1 and 3), or may be independently set at a location different from the L-shaped members (see FIGS. 1, 3 and 5). Optionally, the first slatted side 22 may be fixed in position by means such as the adjusting screw assembly shown in FIG. 6.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters patent of the United States is as follows:

1. A wild game field removal system comprising:
   an elongate U-shaped basket for engaging a wild game carcass, said U-shaped basket having a lateral width and longitudinally-spaced ends;
   a first adjustable support slidably secured to one longitudinal end of the U-shaped basket to permit longitudinal movement of said first support with respect to said U-shaped basket;
   a second adjustable support slidably secured to the longitudinal end of the U-shaped basket opposite of the first adjustable support to permit longitudinal movement of said second support with respect to said U-shaped basket; and
   a vehicle securing means secured to the U-shaped basket for securing to a vehicle;
   wherein said first and second adjustable supports each comprise a U-shaped structure formed by an L-shaped member and a reverse L-shaped member, said L-shaped member and said reverse L-shaped member being laterally moveable with respect to each other to permit adjustment of the lateral spacing therebetween, wherein the lateral spacing between the L-shaped and reverse L-shaped members of each said adjustable support is adjustable independently of the lateral spacing of the other said adjustable support and independently of the lateral width of said U-shaped basket.

2. The wild game field removal system of claim 1 wherein the U-shaped basket includes:
   a substantially rectangular slatted support platform for positioning horizontally, said support platform having elongate sides and ends;
   a first slatted side secured orthogonally to an elongated side of the slatted support platform for orienting parallel to a tailgate of a vehicle;
   a second slatted side secured orthogonally to the elongated side opposite from the first slatted side.

3. The wild game field removal system of claim 1 wherein the vehicle securing means includes:
   a securing pipe for mounting to the rear of the vehicle on an orientation perpendicular to a tailgate of a vehicle;
   tongue member removably projecting into the securing pipe, said tongue member being retained in the securing pipe by a securing pin projecting through the securing pipe and through the tongue member;
   an elevating member orthogonally secured at one end to the end of the tongue member opposite of the securing pipe such that the elevating member projects upwardly and substantially parallel to the tailgate of a vehicle when said securing means is secured to a vehicle;
   a triangular brace secured to the corner formed by the joint between the tongue member and the elevating member; and
   a basket support member secured to the end of the elevating member opposite of the tongue member, said elevating member being secured to the central portion of the basket support member.

4. The wild game field removal system of claim 1 wherein the vehicle securing means includes a basket support member secured to the U-shaped basket, and wherein the first adjustable support includes:
   a first length adjusting shaft slidably projecting into one end of the basket support member;
   said first L-shaped member having a lower horizontal end and a central lower portion secured to the first length adjusting shaft;
   said first reverse L-shaped member having a lower portion slidably projecting into the lower horizontal end of the first L-shaped member;
   a first width adjusting screw projecting through the first L-shaped member to engage the first reverse L-shaped member; and
   a first length adjusting screw projecting through the basket support member to engage the first length adjusting shaft.

5. The wild game field removal system of claim 4 wherein the second adjustable support includes:
   a second length adjusting shaft slidably projecting into one end of the basket support member opposite of the first length adjusting shaft;
   said second L-shaped member having a lower horizontal end and a central lower portion secured to the second length adjusting shaft;
   said second reverse L-shaped member having a lower portion slidably projecting into the lower horizontal end of the second L-shaped member;
   a second width adjusting screw projecting through the second L-shaped member to engage the second reverse L-shaped member; and
   a second length adjusting screw projecting through the basket support member to engage the second length adjusting shaft.

6. The wild game field removal system of claim 1 wherein the first adjustable support and the second adjustable support each include at least one securing means for securing said supports in a selected position.

7. A wild game field removal system comprising:
   an elongate U-shaped basket for engaging a wild game carcass, said U-shaped basket having a lateral width and longitudinally-spaced ends;

a vehicle securing means secured to the U-shaped basket for securing to a vehicle;

a first adjustable support slidably secured to one longitudinal end of the U-shaped basket to permit longitudinal movement of said first support with respect to said U-shaped basket;

a second adjustable support slidably secured to the longitudinal end of the U-shaped basket opposite of the first adjustable support to permit longitudinal movement of said second support with respect to said U-shaped basket; and wherein said first and second adjustable supports each comprise a U-shaped structure formed by an L-shaped member and a reverse L-shaped member, said L-shaped member and said reverse L-shaped member being laterally moveable with respect to each other to permit adjustment of the lateral spacing between said L-shaped member and said reverse L-shaped member;

wherein said U-shaped basket comprises laterally-spaced sides, at least one of said sides being laterally movable with respect to the other said side to permit adjustment of the lateral spacing between the sides of said U-shaped basket; and wherein the lateral spacing between the first and second sides of said U-shaped basket is adjustable independent of the lateral spacing between the L-shaped and reverse L-shaped members of each said adjustable support.

\* \* \* \* \*